US009903227B2

(12) United States Patent
Cigal

(10) Patent No.: US 9,903,227 B2
(45) Date of Patent: Feb. 27, 2018

(54) LUBRICATION SYSTEM FOR A GEAR SYSTEM OF A GAS TURBINE

(71) Applicant: United Technologies Corporation, Farmington, CT (US)

(72) Inventor: Brian P. Cigal, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 136 days.

(21) Appl. No.: 14/961,737

(22) Filed: Dec. 7, 2015

(65) Prior Publication Data

US 2016/0160686 A1 Jun. 9, 2016

Related U.S. Application Data

(60) Provisional application No. 62/089,128, filed on Dec. 8, 2014.

(51) Int. Cl.
*F01D 25/20* (2006.01)
*F01D 15/12* (2006.01)
(Continued)

(52) U.S. Cl.
CPC ............ *F01D 25/20* (2013.01); *F01D 15/12* (2013.01); *F01D 25/18* (2013.01); *F16H 57/045* (2013.01);
(Continued)

(58) Field of Classification Search
CPC .......... F01D 25/20; F01D 25/18; F01D 15/12; F16H 57/045; F05D 2220/32;
(Continued)

(56) References Cited

U.S. PATENT DOCUMENTS 4,658,665 A * 4/1987 Strinzel ............... F16H 57/0442
 184/6.12
6,223,616 B1 * 5/2001 Sheridan ............... F16H 1/2827
 184/6.12

(Continued)

FOREIGN PATENT DOCUMENTS

| EP | 2322766 A1 | 5/2011 |
| EP | 2505878 A1 | 10/2012 |
| GB | 2116645 A | 9/1983 |

OTHER PUBLICATIONS

European Search Report for Application No. 15198498.6-1603; dated Jun. 6, 2016.

*Primary Examiner* — William E Dondero
*Assistant Examiner* — Robert T Reese
(74) *Attorney, Agent, or Firm* — Cantor Colburn LLP

(57) ABSTRACT

The present disclosure is directed to lubrication systems for gear systems of a gas turbine engine. In one embodiment, a lubrication system includes an auxiliary reservoir configured to store lubricant and a lubrication collection device. The auxiliary reservoir is contained within an annular structure of the gas turbine engine. The lubricant collection device can collect lubricant from a gear system of the gas turbine engine and direct collected lubricant to the auxiliary reservoir. The auxiliary reservoir is configured to receive collected lubricant by way of a channel within the annular structure. The lubrication system may compliment a main lubrication system, and in particular, when the main lubrication system is temporarily unable to supply lubricant to the gear system.

19 Claims, 6 Drawing Sheets

(51) Int. Cl.
*F01D 25/18* (2006.01)
*F16H 57/04* (2010.01)

(52) U.S. Cl.
CPC ...... *F05D 2220/32* (2013.01); *F05D 2220/36* (2013.01); *F05D 2260/40311* (2013.01); *F05D 2260/98* (2013.01)

(58) Field of Classification Search
CPC ....... F05D 2220/36; F05D 2260/40311; F05D 2260/98
See application file for complete search history.

(56) References Cited

U.S. PATENT DOCUMENTS

| | | | |
|---|---|---|---|
| 8,381,878 B2* | 2/2013 | DiBenedetto | F01D 25/18 |
| | | | 184/6.11 |
| 9,458,923 B2* | 10/2016 | Poster | F16H 57/027 |
| 2014/0000721 A1 | 1/2014 | McCune et al. | |
| 2014/0182972 A1 | 7/2014 | Hetherington et al. | |
| 2014/0256494 A1 | 9/2014 | Lewis et al. | |
| 2015/0369082 A1* | 12/2015 | Schwarz | F01D 25/18 |
| | | | 415/177 |
| 2016/0169042 A1* | 6/2016 | Korn | F01D 25/20 |
| | | | 184/6.11 |

* cited by examiner

LUBRICATION SYSTEM FOR A GEAR SYSTEM OF A GAS TURBINE

CROSS REFERENCE TO RELATED APPLICATIONS

This Application claims the benefit of U.S. Provisional Patent Application Ser. No. 62/089,128, filed Dec. 8, 2014, the entire contents of which are incorporated herein by reference thereto.

FIELD

The present disclosure relates to gas turbine engine systems and components, and in particular, lubrication systems and components of lubrication systems for gear systems.

BACKGROUND

Gas turbine engine components are required to operate efficiently during engine operation and flight. Components within the gas turbine engine, such as gear systems, may aid in the rotation of an engine shaft, turbines and fans at a high speed. Gear systems rotating at a high speed require lubrication in order to operate efficiently and also to reduce damage to the engine. Certain conditions may prevent lubrication to portions of a gas turbine engine.

Accordingly, there is a need for lubrication systems to maintain adequate lubrication to gear systems of a gas turbine engine.

BRIEF SUMMARY OF THE EMBODIMENTS

Disclosed and claimed herein is a lubrication system and components for a gear system of a gas turbine engine. In one embodiment, the lubrication system includes an auxiliary reservoir configured to store lubricant, wherein the auxiliary reservoir is contained within an annular structure of the gas turbine engine. The lubrication system also includes a lubricant collection device configured to collect lubricant from the gear system of the gas turbine engine and direct collected lubricant to the auxiliary reservoir, wherein the auxiliary reservoir is configured to receive collected lubricant from the lubricant collection device by way of a channel within the annular structure.

In one embodiment, the auxiliary reservoir is a tank integrally formed within a portion of an outer diameter of the support structure.

In one embodiment, the lubricant collection device includes a gutter configured to collect lubricant from the gear system and a gutter channel to output collected lubricant to the auxiliary reservoir within the annular structure.

In one embodiment, the annular structure is a support structure including an inner structure, an outer structure, and a plurality of struts connecting the inner structure to the outer structure.

In one embodiment, the annular structure is a front center body support structure for the gas turbine engine.

In one embodiment, the auxiliary reservoir and the channel within the annular structure are cast within the annular structure.

In one embodiment, the gear system is a fan drive gear system of the gas turbine engine.

In one embodiment, the lubricant collection device is integral to the annular structure and includes a collection path for lubricant of the gear system.

In one embodiment, the lubricant collection device receives lubricant from at least one of a bearing and gears of the gear system.

In one embodiment, the lubrication system includes an auxiliary pump configured to supply collected lubricant from the auxiliary reservoir to the gear system.

In another embodiment, a gas turbine engine includes a main lubrication system, a gear system and an auxiliary lubrication system. The auxiliary lubrication system includes an auxiliary reservoir configured to store lubricant, wherein the auxiliary reservoir is contained within an annular structure of the gas turbine engine. The auxiliary lubrication system includes a lubricant collection device configured to collect lubricant from the gear system of the gas turbine engine and direct collected lubricant to the auxiliary reservoir, wherein the auxiliary reservoir is configured to receive collected lubricant from the lubricant collection device by way of a channel within the annular structure.

In one embodiment, the auxiliary reservoir is a tank integrally formed within a portion of an outer diameter of the support structure.

In one embodiment, the lubricant collection device includes a gutter configured to collect lubricant from the gear system and a gutter channel to output collected lubricant to the auxiliary reservoir within the annular structure.

In one embodiment, the annular structure is a support structure including an inner diameter structure, an outer diameter structure, and a plurality of struts connecting the inner diameter structure to the outer diameter structure.

In one embodiment, the annular structure is a front center body support structure for the gas turbine engine.

In one embodiment, wherein the auxiliary reservoir and the channel within the annular structure are cast within the annular structure.

In one embodiment, the gear system is a fan drive gear system of the gas turbine engine.

In one embodiment, the lubricant collection device is integral to the annular structure and includes collection path for lubricant of the gear system.

In one embodiment, the lubricant collection device receives lubricant from at least one of a bearing and gears of the gear system.

In one embodiment, the lubrication system includes an auxiliary pump configured to supply collected lubricant from the auxiliary reservoir to the gear system.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
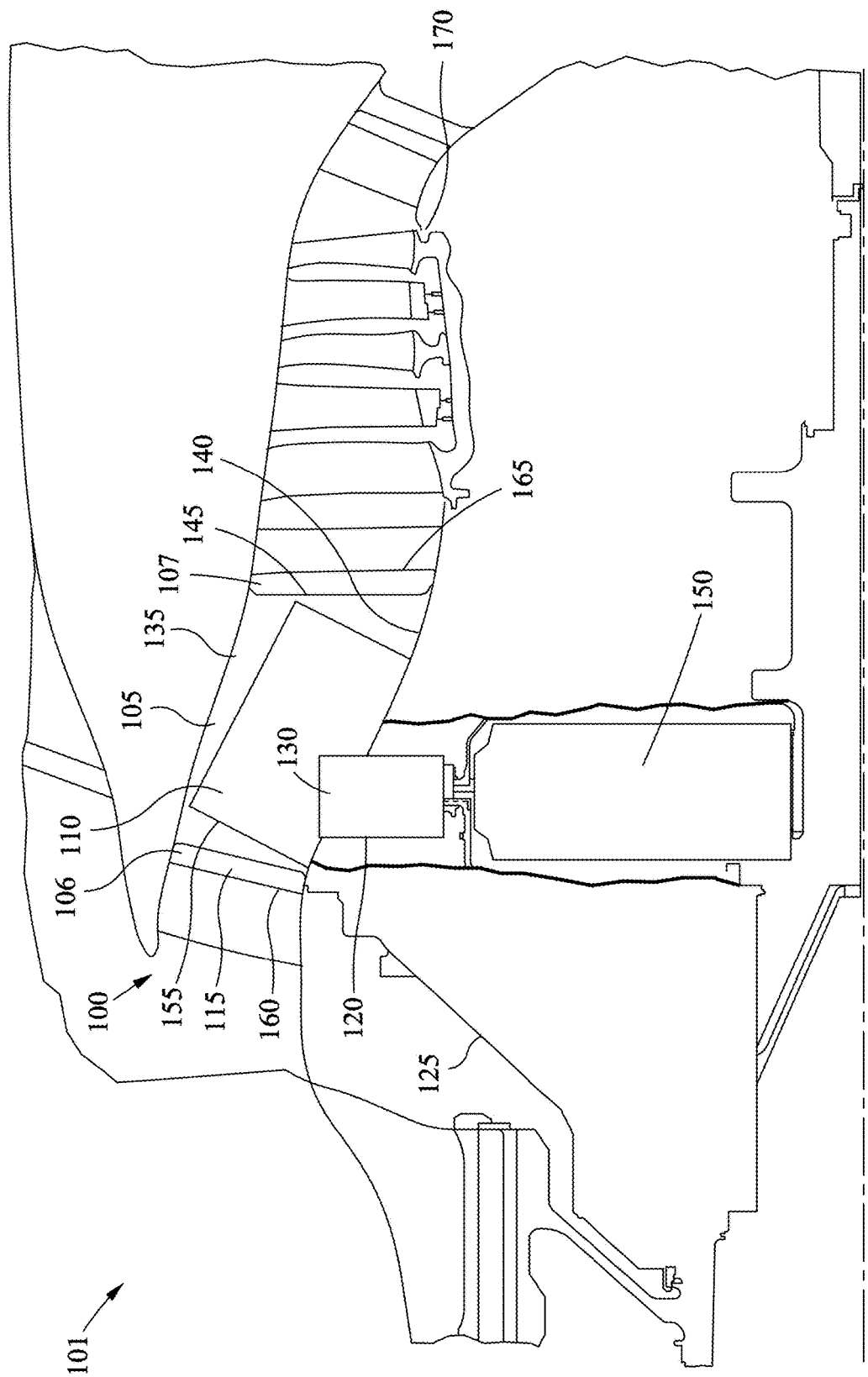
FIG. 1 depicts a cross-sectional representation of a gas turbine engine including a lubrication system for a gear system according to one or more embodiments.

One aspect of this disclosure relates to components for a gas turbine engine, and in particular, lubrication systems and components for a gear system. In one embodiment, a lubrication system is provided that is integrated with a structural support element of a gas turbine engine, such as the front center body. The lubrication system may be configured to lubricate and/or compliment a main lubrication system of a gas turbine engine.

A front center body is an annular support structure associated with a gear system. The front center body may be located with the number two bearing support housing of a gas turbine engine. The front center body may guide secondary airflow and serve as a rigid support for the forward most structure.

The lubrication system may be employed for a fan drive gear system (FDGS) including journal bearings at the star gear-to-torque frame interface. Journal bearings of the FDGS can require constant lubrication during rotation to prevent contact between the parts. The lubrication system may supply constant lubrication, especially during momentary conditions resulting in zero or negative gravity. The auxiliary lubrication system may include at least one of a collection device (gutter) and a storage device (auxiliary oil reservoir). The lubrication system may be configured to include a lubrication collection device having a gutter to collect lubricant and a channel to direct lubricant into the auxiliary oil reservoir for storage.

An auxiliary lubrication system may be provide and maintain a supply of lubricant in addition to and/or separate from main lubrication system and in particular when the main lubrication system does not provide a sufficient supply of lubricant. The term lubricant is utilized to describe a fluid that is supplied to the gear system to provide a desired lubricity and/or heat removal.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a cross-sectional representation of a gas turbine engine including lubrication system 100 for gas turbine engine 101. According to one embodiment, lubrication system 100 may be configured and/or provided with one or more components configured to be integral with a gas turbine engine support structure such as a front center body. According to another embodiment, lubrication system 100 may be configured to lubricate a gear system 150, such as a fan drive gear system (FDGS) of a gas turbine engine.

According to one embodiment, lubrication system 100 includes auxiliary reservoir 110 and lubricant collection device 120. Auxiliary reservoir 110 is configured to receive and/or store lubricant collected by the lubricant collection device 120. According to another embodiment, auxiliary reservoir 110 may be contained within an annular structure of the gas turbine engine 101, such as front center body 105.

Auxiliary reservoir 110 is configured to store and supply lubricant for a gear system 150. Auxiliary reservoir 110 can include a tank, or other lubricant storage device. One or more features of auxiliary reservoir 100 may be integrated within the front center body 105. Auxiliary reservoir 110 can be constructed of a light alloy or other material suitable for use in gas turbine engine 101. Auxiliary reservoir 110 can include an inlet port 130. As will be described in more detailed below with regards to FIG. 2, auxiliary reservoir 110 may include a supply port (shown in FIG. 2 as 230). Inlet port 130 is an entry point for lubricant into the auxiliary reservoir from the gear system 150. The supply port of the auxiliary reservoir 110 is an exit point for lubricant to return to the gear system 150. As such, auxiliary reservoir 110 may be cast or integrated within walls of an annular structure. Auxiliary reservoir 110 may include one or more outer surfaces 155 to partially or substantially line the inner cavity walls, shown as 115, 135, 140, 145, of the front center body 105. Auxiliary reservoir 110 can be secured within the inner cavity walls 115, 135, 140, 145 of the front center body 105 adjacent to the number one housing 125. In certain embodiments, auxiliary reservoir 110 can also be pressurized to retain constant flow of lubricant to gear system 150. In other embodiments, auxiliary reservoir 110 may interoperate with a lubrication pump. Auxiliary reservoir 110 can store and/or provide constant lubricant pressure to gear system 150 during zero or negative gravity. Although auxiliary reservoir 110 is shown above gear system 150 in FIG. 1, auxiliary reservoir 110 may be positioned below the gear system, such as the embodiment depicted in FIG. 3.

Lubricant collection device 120 is configured for mounting within a number one housing 125 of gas turbine engine 101 to collect lubricant from the gear system 150 of a gas turbine engine and direct collected lubricant to the auxiliary reservoir 110. Lubricant collection device 120, which may include a gutter, is configured to collect lubricant, such as excess or expelled lubricant from gear system 150 and to direct collected lubricant to inlet port 130 of the auxiliary reservoir 110. Lubricant collection device 120 may be configured to provide lubricant to the auxiliary reservoir 110 by way of a channel within an annular structure, such as a strut of front center body 105.

The front center body 105 is an annular structure that at least partially defines the core flowpath into the low pressure compressor 170. The front center body section 105 includes an annular core passage with circumferentially arranged front center body vanes 106 and 107 having leading and trailing edges 160, 165. The number one housing 125 may be defined as being radially inward of the front center body 105. The number one housing 125 can house and/or support a fan drive gear system, such as gear system 150, which is configured to include gears and bearings, such as a journal bearings.

Gear system 150 of gas turbine engine 101 can include one or more gears and bearings of a fan drive gear system. In one embodiment, lubrication system 100 supplies lubricant to gear system 150 when the main engine lubrication system cannot supply adequate lubricant, such as under zero or negative gravity conditions. In certain embodiments, gear system 150 is supplied lubricant by the main engine lubrication system in addition to lubricant supplied by auxiliary lubrication system.

In one embodiment, components of lubrication system 100 may be integrated. For example, the auxiliary reservoir 110 may be integrally formed into front center body section 105. Lubrication system 100 may also include an auxiliary pump (shown in FIG. 2 as 215 and FIG. 3 as 320) and one or more supply lines configured to supply collected lubricant from auxiliary reservoir 110 to gear system 150.

Figure 2:
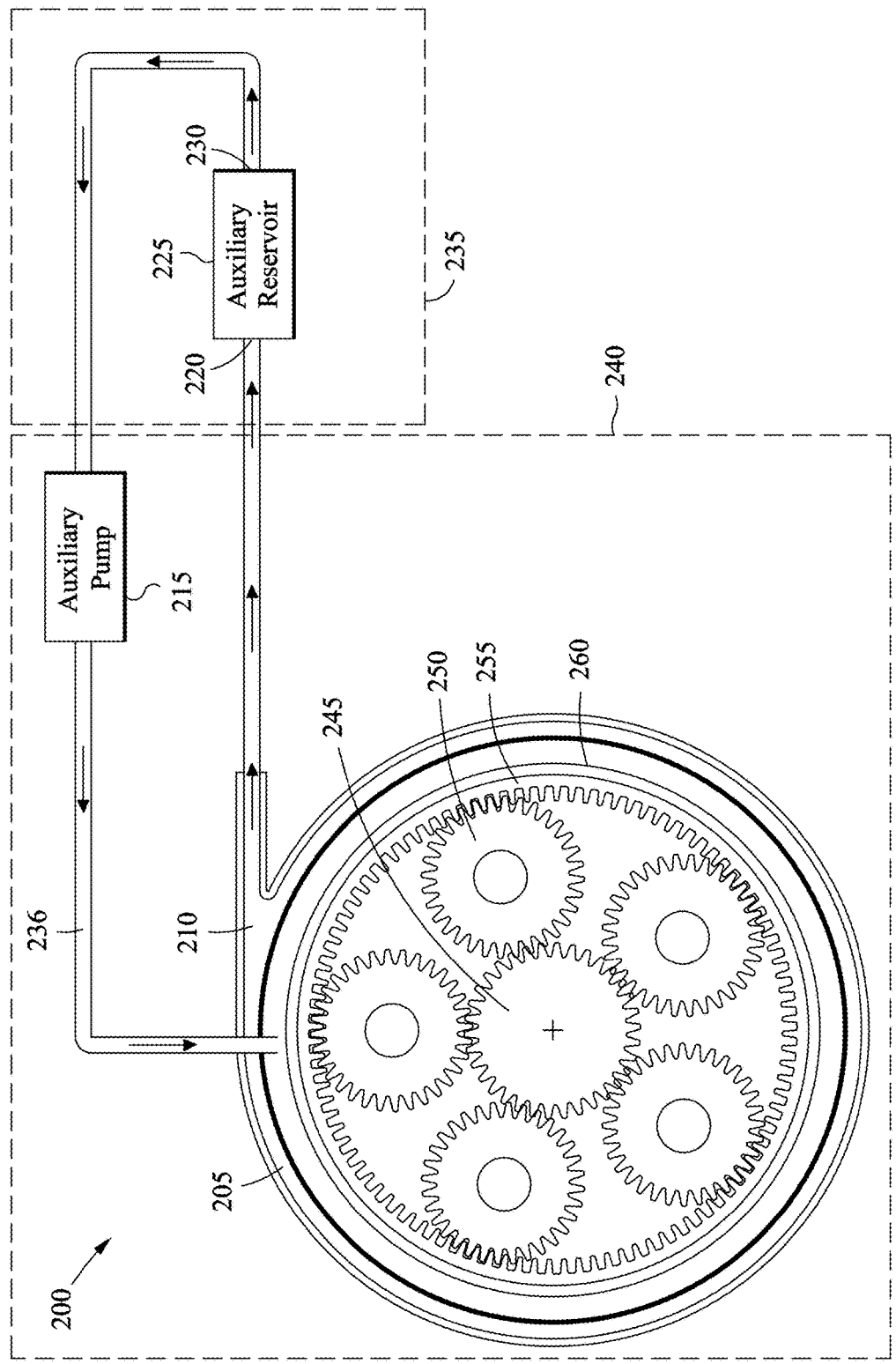
FIG. 2 depicts a graphical representation of a lubrication system for a gear system according to one or more embodiments.

FIG. 2 depicts a graphical representation of a lubrication system 200 for a gear system 205 according to one or more embodiments. Lubrication system 200 is another representation of lubrication system 100 of FIG. 1. According to one embodiment, lubrication system 200 includes a lubrication collection device 210 and auxiliary reservoir 225. Auxiliary reservoir 225 may be within the front center body 235 of a gas turbine engine. Auxiliary reservoir 225 is configured to receive collected lubricant from the lubricant collection device 210 through an inlet port 220. Lubrication system 200 may also include an auxiliary pump 215 (also shown in and FIG. 3 as 320) configured to supply lubricant from auxiliary reservoir 225 to one or more elements of gear system 205.

According to one embodiment, components of lubrication system 200 may be associated with the number one housing, shown as 240, of a gas turbine engine which may be forward or even with the front center body 235. The number one housing 240 includes a gear system 205 which is configured to include gears and bearings 260, such as journal bearings. Gears of gear system 205 include a star gear 245, at least one intermediate gear 250, and a ring gear 255.

Although shown in association with number one housing 240, auxiliary pump 215 may be configured to be within the number one housing 240 or the front center body 235. Auxiliary reservoir 225 returns collected lubricant to gear system 205 through a supply port 230, auxiliary pump 215 and supply line 236. Supply port 230 and start of the supply line 236 may be found in the front center body 235. The supply line 236 may run from the front center body 235 to the number one housing 240 to supply lubricant to the gear system 205. Auxiliary reservoir 225 can be pressurized to retain constant flow of lubricant to gear system 205 through a supply port 230 and supply line 236. In another embodiment, auxiliary reservoir 225 supplies constant lubricant pressure through a supply port 230 and supply line 236 by way of auxiliary pump 215 to gear system 205 during zero or negative gravity. Auxiliary reservoir 225 and lubricant collection device 210 are shown as separate elements, but may be integrated.

Figure 3:
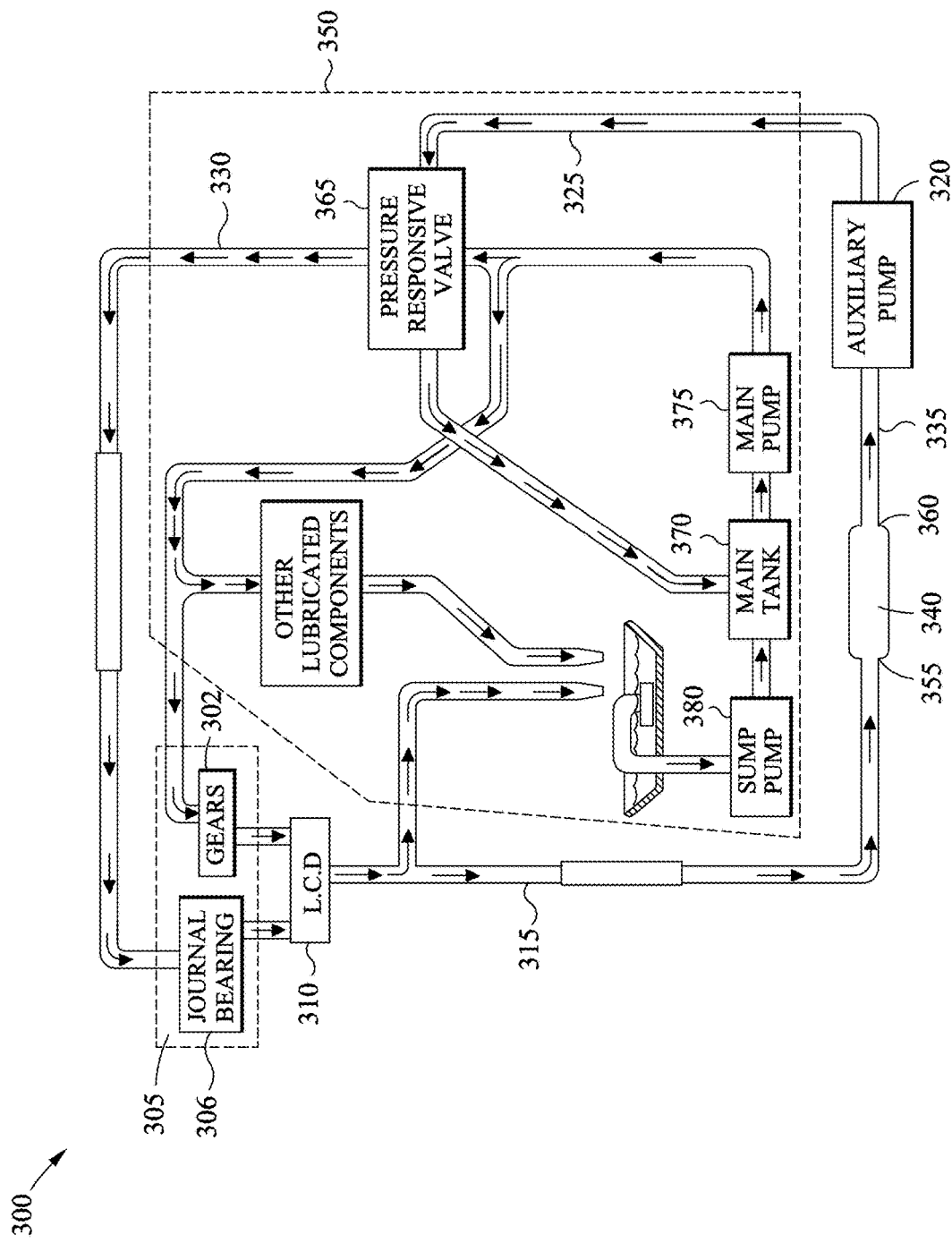
FIG. 3 depicts a graphical representation of a lubrication system according to one or more embodiments.

FIG. 3 depicts a graphical representation of lubrication system 300 according to one or more embodiments. Lubrication system 300 is presented for lubrication of a gear system and may interoperate with a main engine lubrication system, shown as 350. According to one embodiment, lubrication system 300 may be provided for gear system 305 including gears 302 and journal bearings 306. Lubrication system 300 includes a lubricant collection device 310, and auxiliary reservoir 340 configured to receive collected lubricant from the lubricant collection device 310.

According to one embodiment, lubricant from gear system 305 is collected by lubricant collection device 310 and then can be directed to auxiliary reservoir 340 and/or main engine lubrication system 350. Supply line 315 provides lubricant from lubricant collection device 310 to auxiliary reservoir 340. Auxiliary reservoir 340 may be configured to receive collected lubricant from supply line 315 via an inlet port 355. Auxiliary reservoir 340 includes output 360 to provide lubricant to auxiliary pump 320 via supply line 335. Auxiliary pump 320 directs lubricant from auxiliary reservoir 340 to pressure responsive valve 365 via supply line 325. Pressure responsive valve 365 can direct lubricant to gear system 305 by way of main lubrication system 350. According to another embodiment, pressure responsive valve 365 can direct lubricant to gear system 305 by way of supply line 330.

Main lubrication system 350 includes main tank 370, main pump 375, sump pump 380, and pressure responsive valve 365. Lubricant from the main lubrication system 350 is returned to gear system 305 via the pressure responsive valve 365. Gear system 305 may operate with main lubrication system 350 such that lubricant returned to the auxiliary reservoir 340 and/or main tank 370 may be distributed by pressure responsive valve 365.

In one embodiment, lubrication system 300, and in particular the auxiliary components lubricant collection device 310, auxiliary reservoir 340 and auxiliary pump 320, supply lubricant to gear system 305 when the main engine lubrication system 350 cannot supply adequate lubricant. Under zero or negative gravity conditions, lubricant returned to the auxiliary reservoir 340 may be regulated and distributed by the pressure responsive valve 365. In that fashion, lubricant from auxiliary reservoir 340 can be supplied to gear system 305, and in particular journal bearing 306 under zero or negative gravity conditions.

Figure 4A:
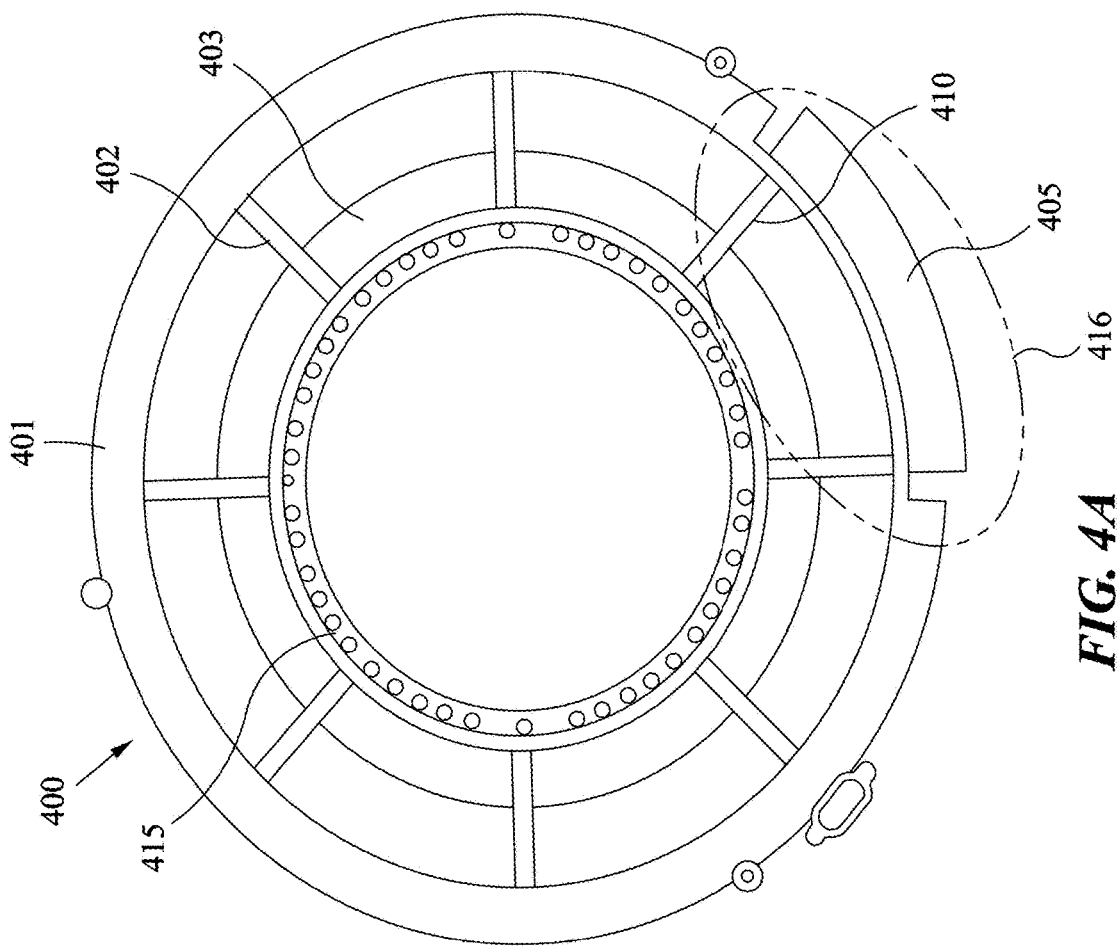
FIG. 4A depicts a graphical representation of an annular structure according to one or more embodiments.

FIG. 4A depicts a graphical representation of an annular structure according to one or more embodiments. According to one embodiment, a lubrication system may be provided in association with, or integrated with, an annular support structure of a gas turbine engine, such as a front center body of a gas turbine engine. FIG. 4A depicts annular structure 400 including an outer structure 401, support struts 402 and inner structure 403. Support struts 402 connect outer structure 401 and inner structure 403. Annular structure 400 may be the front center body support structure for the gas turbine engine.

According to one embodiment, an outer structure 401 of annular structure 400 may be configured to contain an auxiliary reservoir 405. In one embodiment, auxiliary reservoir 405 is a tank integrally formed within a portion of an outer structure 401 of annular structure 400, which may be a support structure. Auxiliary reservoir 405 and channel 410 within the annular structure 400 may be cast within the annular support structure 400.

Auxiliary reservoir 405 may be configured to receive collected lubricant from the lubricant collection device 415 by way of a channel 410 within the annular structure 400. In that fashion, lubricant collection device 415 is configured to collect lubricant from a gear system of the gas turbine engine (not shown in FIG. 4A) and direct collected lubricant to the auxiliary reservoir 405 by way of channel 410 within the annular structure 400. Lubricant collection device 415 may be mounted to a gear system and includes a collection path for lubricant of the gear system. Channel 410 may be formed within a strut of annular structure 400.

Figure 4B:
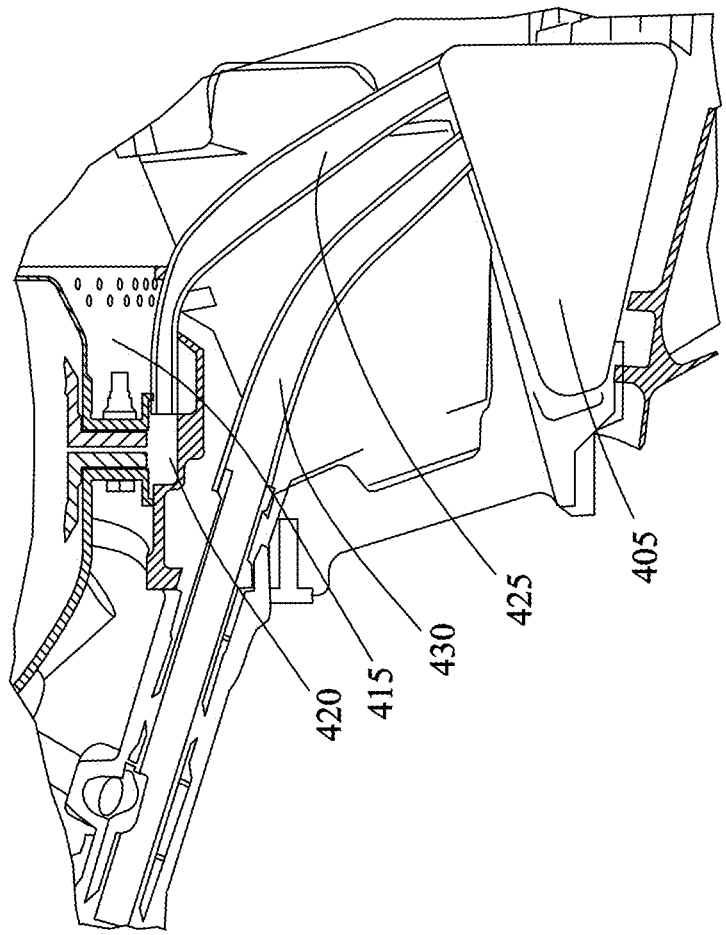
FIG. 4B depicts a graphical representation of an annular structure relative to a gas turbine engine according to one or more embodiments.
Figure 4C:
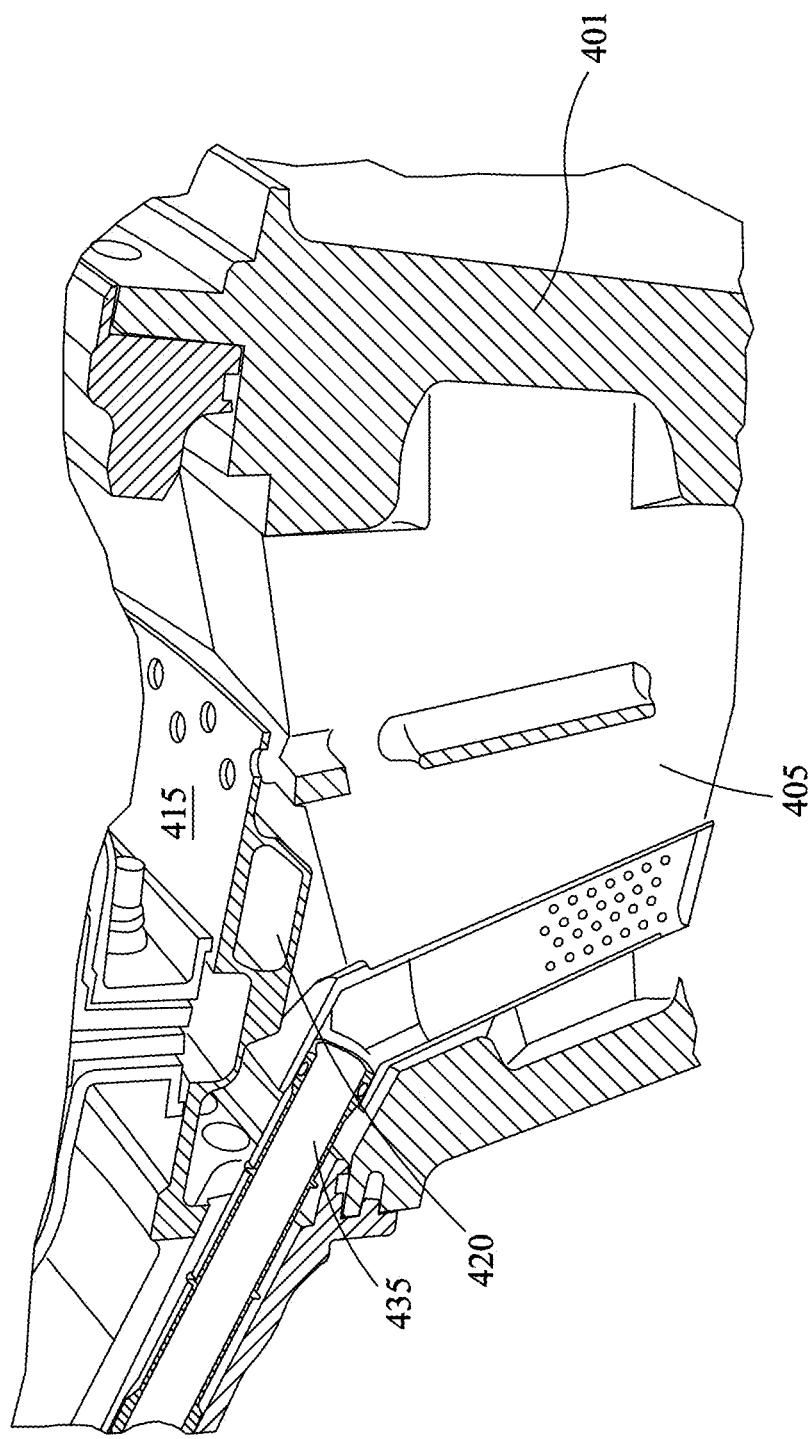
FIG. 4C depicts a graphical representation of an annular structure relative to a gas turbine engine according to one or more embodiments.

Integration of collection and storage features into annular structure 400 reduces the weight and complexity of the lubrication system. In addition, a more efficient transition into the auxiliary reservoir 405 may be provided. According to one embodiment, auxiliary reservoir 405 may be stored in a lower portion of annular structure 400 shown as 416. Portion 416 may relate to a section below the fan drive gear system of a gas turbine engine. FIGS. 4B-4C depict portion 416 from different perspectives.

FIG. 4B depicts a graphical representation of portion 416 of the annular structure of FIG. 4A relative to a gas turbine engine according to one or more embodiments. Lubricant collection device 415 includes a gutter configured to collect lubricant from the gear system and a gutter channel 420 to output collected lubricant to the channel within the annular structure. Auxiliary reservoir 405 may receive lubricant from lubricant collection device 415, via gutter channel 420 and channel passage 425 (e.g., channel 410) which may be integral with a strut of an annular structure 400 of FIG. 4A. Auxiliary tank 405 may supply lubricant to an auxiliary pump via passage 430 which may also be integral with annular structure 400.

FIG. 4C depicts a graphical representation of an annular structure relative to a gas turbine engine according to one or more embodiments. According to one embodiment, a lubricant collection device 415 may be integrally formed with auxiliary reservoir 405. As shown in FIG. 4C, gutter channel 420 and lubricant collection device 415 provide a direct channel for lubricant collected by lubricant collection device 415 into auxiliary reservoir 405. In addition, auxiliary reservoir 405 is shown integrally formed within an annular support structure, an in particular, outer structure 401. Return passage 435 allows for lubricant stored by auxiliary reservoir 405 to be applied to a gear system.

While this disclosure has been particularly shown and described with references to exemplary embodiments thereof, it will be understood by those skilled in the art that various changes in form and details may be made therein without departing from the scope of the claimed embodiments.

What is claimed is:

1. A lubrication system for a gear system of a gas turbine engine, the lubrication system comprising:
    an auxiliary reservoir configured to store lubricant, wherein the auxiliary reservoir is contained within an annular structure including an inner structure, an outer structure, and a plurality of struts connecting the inner structure to the outer structure; and
    a lubricant collection device disposed radially inward of the auxiliary reservoir and the inner structure, the lubricant collection device being configured to collect lubricant from the gear system of the gas turbine engine and direct collected lubricant to the auxiliary reservoir, wherein the auxiliary reservoir is configured to receive collected lubricant from the lubricant collection device by way of a channel formed within a strut of the plurality of struts.

2. The lubrication system of claim 1, wherein the auxiliary reservoir is a tank integrally formed within a portion of the outer structure of the annular structure.

3. The lubrication system of claim 1, wherein the lubricant collection device includes a gutter configured to collect lubricant from the gear system and a gutter channel to output collected lubricant to the auxiliary reservoir within the annular structure.

4. The lubrication system of claim 1, wherein the annular structure is a front center body support structure for the gas turbine engine.

5. The lubrication system of claim 1, wherein the auxiliary reservoir is cast within the outer structure and the channel is cast within the inner structure.

6. The lubrication system of claim 1, wherein the gear system is a fan drive gear system of the gas turbine engine.

7. The lubrication system of claim 1, wherein the lubricant collection device is integral to the annular structure and includes a collection path for lubricant of the gear system.

8. The lubrication system of claim 1, wherein the lubricant collection device receives lubricant from at least one of a bearing and gears of the gear system.

9. The lubrication system of claim 1, further comprising an auxiliary pump configured to supply collected lubricant from the auxiliary reservoir to the gear system.

10. A gas turbine engine comprising:
    a main lubrication system;
    a gear system; and
    an auxiliary lubrication system including:
        an auxiliary reservoir configured to store lubricant, wherein the auxiliary reservoir is contained within an annular structure of the gas turbine engine; and
        a lubricant collection device disposed radially inward of the auxiliary reservoir and configured to collect lubricant from the gear system of the gas turbine engine and direct collected lubricant to the auxiliary reservoir, wherein the auxiliary reservoir is configured to receive collected lubricant from the lubricant collection device by way of a channel formed within a strut of the annular structure.

11. The lubrication system of claim 10, wherein the auxiliary reservoir is a tank integrally formed within a portion of an outer diameter of the annular structure.

12. The lubrication system of claim 10, wherein the lubricant collection device includes a gutter configured to collect lubricant from the gear system and a gutter channel to output collected lubricant to the auxiliary reservoir within the annular structure.

13. The lubrication system of claim 10, wherein the annular structure is a support structure including an inner diameter structure, an outer diameter structure, and a plurality of struts connecting the inner diameter structure to the outer diameter structure.

14. The lubrication system of claim 13, wherein the auxiliary reservoir is cast within outer diameter structure and the channel within the annular structure is cast within the strut of the plurality of struts.

15. The lubrication system of claim 10, wherein the annular structure is a front center body support structure for the gas turbine engine.

16. The lubrication system of claim 10, wherein the gear system is a fan drive gear system of the gas turbine engine.

17. The lubrication system of claim 10, wherein the lubricant collection device is integral to the annular structure and includes collection path for lubricant of the gear system.

18. The lubrication system of claim 10, wherein the lubricant collection device receives lubricant from at least one of a bearing and gears of the gear system.

19. The lubrication system of claim 10, further comprising an auxiliary pump configured to supply collected lubricant from the auxiliary reservoir to the gear system.

* * * * *